United States Patent Office 3,470,147
Patented Sept. 30, 1969

3,470,147
CHLORINATION OF POLYETHYLENE
Leonard Marshall Shorr and Noah Sofer, Haifa, Israel, assignors to Israel Mining Industries-Institute for Research and Development, near Ir Ganim, Haifa Bay, Israel, and Israel Petrochemical Enterprises Ltd., Haifa Bay, Haifa, Israel, both Israeli companies
No Drawing. Filed Nov. 7, 1966, Ser. No. 592,313
Claims priority, application Israel, Nov. 25, 1965, 24,681
Int. Cl. C08f 27/03
U.S. Cl. 260—94.9                                5 Claims

ABSTRACT OF THE DISCLOSURE

This invention is concerned with the chlorination of polyethylene wherein the polymer is dissolved in an organic solvent of dielectric constant up to 20 and then precipitated by a solvent of dielectric constant above 20 prior to chlorination.

---

The present invention concerns the chlorination of polyethylene in the solid state.

As is known the properties of polyethylene may be modified and the range of its applicability broadened by chlorination and various processes for the chlorination of polyethylene have already been suggested. Thus, for example, it is known to chlorinate polyethylene in solution. This method, however, involves serious problems in the recovery of the solvents after the chlorination. Also in view of the solution viscosity it is difficult to achieve a homogeneous dispersion of the chlorine in the reaction mixture so that the reaction rate is rather low.

It is also known to chlorinate polyethylene in aqueous or non-aqueous suspension. However, it has been observed that in this process the polyethylene is as a rule only block-chlorinated, that is only the amorphous zones are chlorinated while the crystalline zones remain unaffected. The products obtained in this manner are as a rule rigid and brittle and unstable towards heat and light.

It has furthermore already been suggested to chlorinate polyethylene in bulk. However here again it has been observed that there occurs mainly block-chlorination and it is difficult to regulate the chlorination so as to obtain stable chlorinated polyethylenes of uniform structure. In order to accomplish a uniform chlorination along the polymer chain in both the amorphous and crystalline zones it has been suggested to apply relatively drastic conditions of temperatures and $Cl_2$ concentration in the feed gas. However, in this process there exists the danger of the polyethylene being charred or fused in a runaway reaction.

In order to overcome these difficulties it has further been suggested to carry out the reaction in the presence of antistatic agents, such as for example quaternary ammonium salts, dodecyl dimethyl ammonium chloride and the like. However, in this manner the product becomes contaminated with the antistatic agent which is used in a relative proportion of up to 5% by weight, so that additional treatment such as, for example, solvent extraction is required for its removal.

It has further been suggested to carry out the chlorination in two stages, in the first of which about 20% by weight of chlorine is introduced into the polyethylene by bulk chlorination while in the second stage the product of the first stage is dissolved in perchloro ethylene and the chlorination is continued at 116° C. to obtain the desired randomly chlorinated product. However, this second stage is actually a solution chlorination involving the above referred to drawbacks and difficulties.

In accordance with the invention it has surprisingly been found that if polyethylene is dissolved in a solvent having a dielectric constant (DC) not exceeding 20 and is then reprecipitated from such a solvent either by the addition of another solvent of a higher dielectric constant or by rapid cooling the reprecipitated polyethylene can be easily chlorinated in bulk. It has further been observed, in accordance with the invention, that in this process it is possible by a judicious selection of the reaction conditions and the chlorine content of the feed gas, to obtain, for a wide range of chlorine contents of the product, at will either a block-chlorinated or a random chlorinated product.

The invention thus provides a process for the chlorination of polyethylene comprising the steps of dissolving polyethylene in an organic solvent having a dielectric constant not higher than 20, precipitating the polyethylene from its solution, recovering the precipitated polyethylene, and submitting the recovered polyethylene to chlorination in bulk until the product has the desired chlorine content.

The precipitation of the polyethylene from its solution in the organic solvent can be done either by the addition of a liquid having a dielectric constant higher than 20, or by rapid cooling. It is also possible to combine the two methods.

Examples of solvents that have dielectric constants nto higher than 20 and can be used for the dissolution of the polyethylene are carbon tetrachloride, tetrahydrofuran, toluene, xylene. Examples of liquids having a dielectric constant above 20 which can be used for the reprecipitation of the polyethylene are methanol, acetone, water.

In the process of the invention the chlorination proceeds smoothly and rapidly. It has been found, in accordance with the invention, that where the feed gas contains only 10% of chlorine or less the chlorination takes place substantially only in the amorphous zone whereby a block-chlorinated crystalline product is obtained. If the chlorine content of the feed gas is higher than 10% the chlorination will as a rule occur at random. The fact that after dissolution and reprecipitation in accordance with the invention the polyethylene can readily be chlorinated in bulk is presumably to be explained as an activation of the polyethylene by this pretreatment. The degree of activation achieved in this manner seems to depend on the liquids used, respectively, as solvents and precipitants, and on the conditions in which the dissolution at precipitation are performed. These operations will therefore be conducted under such conditions that the desired chlorinated product (crystalline or amorphous), block or randomly chlorinated, is subsequently obtained. For example, if the product desired is a crystalline, block-chlorinated polymer, the use of $CCl_4$ (DC=2) as a solvent, and of $CH_3OH$ (DC=31) as a precipitant is particularly effective.

Against this, polyetheylene obtained, for example, by the sudden cooling of a $CCl_4$ solution is less discriminating regarding the zone of attack and its chlorination proceeds mostly at random.

The activation of the polyethylene by dissolution and reprecipitation does not seem to be caused by result of a finer degree of comminution of the polyethylene resulting from this pretreatment. This is shown by the following comparative figures: when polyethylene particles of the size within the range of −30 +100 mesh (Tyler standard sieve), activated by the pretreatment in accordance with the invention, are subjected to bulk chlorination, the chlorine content of the product is approximately 34% after 15 minutes, while against this, when a powder of the same polyethylene having a particle size of −200 mesh, not activated by the pretreatment in accordance with the invention, is chlorinated under the same conditions the chlorine content of the product that can be solvent is only 23.5%.

By the activation in accordance with the invention the degree of crystallinity of the polyethylene serving as starting material is not affected. However, a miscroscopic examination has revealed that the treatment causes a change in the structure of the solid as compared to its structure prior to the treatment in that the crystalline portions are more equally distributed and more exposed. It has been found that in many cases the chlorination of the pretreated polyethylene proceeds more smoothly if it is carried out under UV irradiation if a wavelength within the range of 3,200 to 4,500 A.

The bulk chlorination of the polyethylene activated in accordance with the invention can be conducted at between room temperature and a temperature near, but not above the softening point of the polyethylene. Thus an activated polyethylene powder can be chlorinated at ambient temperature to yield a product of approximately 20% chlorine content without any external heating. Owing to the exothermic character of the chlorination the temperature rises, if permitted to do so, whereby the chlorination is further stimulated. By the appropriate control of the temperature and of the chlorine concentration of the feed gas the reaction can be controlled so that the final product has the desired chlorine content and zone of attack.

The temperature during the chlorination must be controlled, especially when low-density polyethylene is used. This polyethylene has a lower melting point than has high-density polyethylene and may become fused if the reaction temperature is allowed to rise up to or above the melting point. Moreover a proper control of the temperature is also required because of the high reactivity of the activated polyethylene in order to prevent charring of the polyethylene in the course of being chlorinated. When these factors are considered low-density polyethylene can easily be chlorinated in accordance with the invention while it is known that, for example, the block chlorination of such a product, with a view to yielding a block-chlorinated product of relatively high residual crystallinity has been difficult to achieve by known methods.

The invention is illustrated by the following examples to which it is not limited:

Example 1

100 g. of chips of high-pressure, low-density polyethylene (molecular weight about 24,000) and M.P.I. (melt flow index) 20.9 were dissolved in 1000 ml. of carbon tetrachloride under reflux and the dissolved polyethylene was precipitated by the addition of 800 ml. of acetone. After filtration the cake was left to stand overnight and when partially dry, screened through a 30 mesh sieve (Tyler standard sieve). It was finally dried at 50° C. to constant weight. The area of the endothermic peak measured on DTA (which indicates the crystallinity of the polyethylene obtained) was 1.19 cm.$^2$/25 mg. 20 g. of this activated polyethylene were introduced into a 300 ml. rotary Pyrex flask illuminated by means of an ultraviolet source of 125 watts. 12.5 liters per hour chlorine gas and 19 liters per hour of nitrogen (as a diluent) were introduced concurrently during 60 minutes. The block chlorinated product obtained contained 13.7% by weight of chlorine and had a crystalline character, its peak measured by differential thermal analysis (DTA) being 1.10 cm.$^2$/25 mg.

This indicates that the degree of crystallinity remained substantially unchanged.

Example 2

20 g. of chips of polyethylene (the same type as in Example 1) were dissolved in 100 ml. of carbon tetrachloride under reflux and the dissolved polyethylene was precipitated by the dropwise addition of 100 ml. of methanol to the solution. The precipitate was filtered, dried overnight at room temperature, and the powder was screened through a 30 mesh sieve, and finally dried at about 50° C. to constant weight. The area of the endothermic peak measured on DTA was 1.01 m.$^2$/25 mg. The chlorination was performed in the same reaction vessel as in Example 1, the composition of the feed gas being 5 liters per hour of chlorine and 38 liters per hour of nitrogen. After 90 minutes the product obtained contained 34.3% by weight of chlorine and had a crystalline character, its peak measured by DTA being 0.84/25 cm.$^2$/mg.

Example 3

20 g. of polyethylene powder, prepared by dissolution precipitation, screening and drying as described in Example 1, were chlorinated in an apparatus consisting of a coarse sintered glass filter with a 22 mm. diameter sieve plate. The composition of the feed gas was 7.1 liters per hour of $Cl_2$ and 17.5 liters per hour of $N_2$. After 7 minutes of chlorination the random-chlorinated product contained 17.1% by weight of $Cl_2$ and had an amorphous character as revealed by its infra-red spectrogram.

Example 4

The process of Example 3 was repeated with the same kind of polyethylene, the same activation process, the same apparatus, the same reaction time but with a different feed gas composition, namely, 1.76 liters per hour of $Cl_2$ and 17.5 liters per hour of $N_2$. The block-chlorinated final product contained 17.9% by weight of $Cl_2$ and had a strong crystalline character as revealed by its IR spectrum.

This shows that products having approximately the same chlorine content but a different character can be prepared under otherwise indicated conditions, by means of variations in the feed gas composition.

Example 5

The same kind of polyethylene, activated as described in Example 2, was used. The composition of the feed gas was 5 liters per hour of $Cl_2$ and 38 liters per hour of $N_2$. At the start of the chlorination, the powder had a tendency to agglomeration. As the chlorination proceeded the powder became more fluid. After chlorination for 35 minutes the product contained 38.6% by weight of Cl. The chlorination was effected by means of a feed gas composition of 16 liters per hour of $Cl_2$ and 15 liters per hour of $N_2$. After an additional 60 minutes the random-chlorinated product contained 50.4% by weight of $Cl_2$ and its crystalline character was negligible, a peak of only 0.1 m.$^2$/15 mg. being formed by DTA.

Example 6

20 g. of polyethylene powder prepared as described in Example 1, were chlorinated with the acid of a coarse sintered-glass filter with a 22 mm. diameter sieve plate. The composition of the feed gas was 4.9 liters per hour of $Cl_2$ and 17.5 liters per hour of $N_2$. After 3 minutes, the product contained 17.2% by weight of $Cl_2$ and its character was only slightly crystalline as revealed by infra-red studies.

Example 7

The process of Example 6 was repeated with a different feed gas composition, namely 3.7 liters per hour of $Cl_2$ and 19.4 liters per hour of $N_2$. After 5 minutes the random-chlorinated product contained 17.4% by weight of $Cl_2$ and had an amorphous character.

Example 8

15 g. of high-pressure, low-density polyethylene with a molecular weight of about 32,000 and a melt flow index of 1.8 were dissolved in 150 ml. of tetrahydrofuran in the course of 15 minutes at reflux temperature. When the solution had cooled to 50° C., 30 ml. of water were added to it dropwise, a thick gel was formed. By the addition of more water the gel was transformed into a powder.

The chlorination was performed with a feed gas containing 5 liters per hour of $Cl_2$ and 20 liters per hour of $N_2$. After 55 minutes the product contained about 30% by weight of chlorine and had a crystalline character. The chlorination was continued for another 60 minutes with a feed of 13 liters per hour of $Cl_2$ and 20 liters per hour of $N_2$. The product contained 44.5% by weight of $Cl_2$ and its DTA showed a peak of 0.53 cm.$^2$/mg., as compared with 1.4 cm.$^2$/25 mg. for the unchlorinated polymer.

Example 9

Low-pressure high-density polyethylene (melt flow index 0.6) was dissolved in xylene and precipitated by the addition of methanol. The chlorination was performed with a feed gas containing about 35 liters per hour of $Cl_2$ and 40 liters per hour of $N_2$. After 40 minutes of chlorination the random-chlorinated product contained 55.2% by weight of chlorine and had a completely amorphous character, as revealed by its DTA thermogram. The original polyethylene had an endotherm of 4.3 cm.$^3$/25 mg.

Example 10

A boiling solution of 20 g. of polyethylene of the type used in Example 1 in 200 ml. of carbon tetrachloride was subjected to sudden cooling to 40° C. at reduced pressure. The polymer which precipitated was separated from the carbon tetrachloride and subsequently chlorinated in the same manner and to the same extent as described in Example 1. However a comparison of the IR spectra of the products showed this material to be much less crystalline than that obtained in Example 1.

We claim:
1. A process for the chlorination of polyethylene comprising the steps of dissolving the polyethylene in an organic solvent having a dielectric constant within a range up to 20, precipitating the polyethylene from this solution, recovering the precipitated polyethylene, and submitting the recovered polyethylene to chlorination in bulk until the product has the desired chlorine content.

2. Process according to claim 1, wherein the precipitation of the polyethylene from said solution is effected by the addition of a liquid having a dielectric constant higher than 20.

3. Process according to claim 1, wherein the precipitation of the polyethylene from said solution is effected by rapid cooling.

4. Process according to claim 1, wherein said organic solvent having a dielectric constant within a range up to 20 is selected from the group consisting of carbon tetrachloride, tetrahydrofuran, toluene and xylene.

5. Process according to claim 2, wherein said liquid having a dielectric constant higher than 20 is selected from the group consisting of methanol, acetone and water.

References Cited
UNITED STATES PATENTS 2,928,819   3/1960   Noeske _____ 260—94.9
3,060,164   10/1962  Canterino _____ 260—94.9

JOSEPH L. SCHOFER, Primary Examiner

R. A. GAITHER, Assistant Examiner